Sept. 9, 1952          L. SHIELD          2,610,086
COLLAPSIBLE COVER FOR VEHICLE BEDS
Filed Feb. 26, 1951
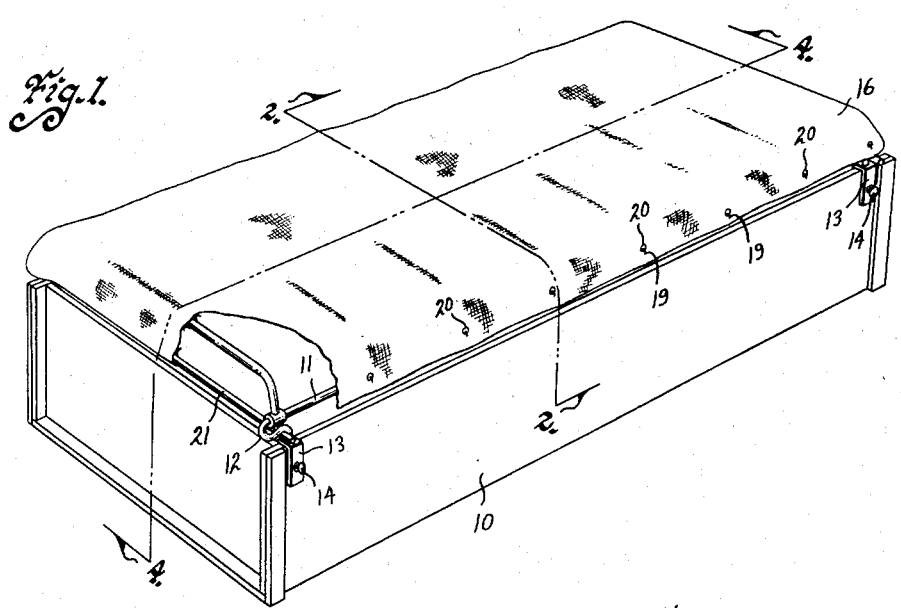
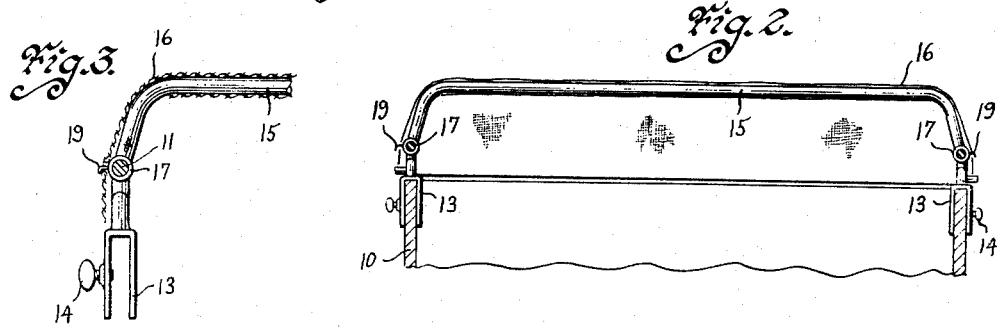
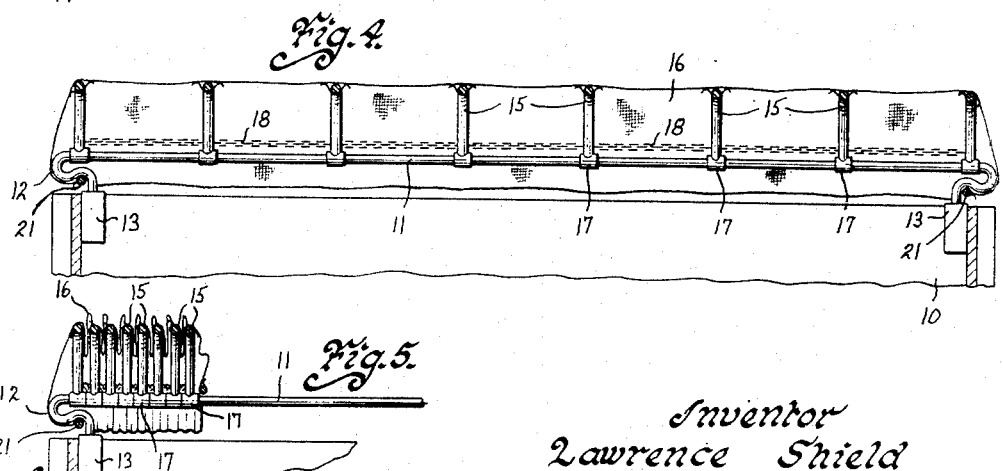
Inventor
Lawrence Shield
by M. Talbert Dick
Attorney
Witness
Edward P. Seeley Patented Sept. 9, 1952

2,610,086

UNITED STATES PATENT OFFICE 2,610,086

COLLAPSIBLE COVER FOR VEHICLE BEDS

Lawrence Shield, Reinbeck, Iowa

Application February 26, 1951, Serial No. 212,718

6 Claims. (Cl. 296—105)

1

My invention relates to a collapsible and removable cover for a vehicle bed or the like.

An open top vehicle bed or wagon box is sometimes preferable to boxed-in or enclosed vans to facilitate the loading of material to be moved. An example of this is found when free flowing matter such as oats or the like is delivered to the vehicle bed. Obviously, this can be accomplished more expeditiously if the vehicle bed is not enclosed. Such a bed is of course useful in loading other items but an enumeration thereof is not deemed necessary at this point.

Once an open top vehicle bed is loaded, however, it may become desirable or necessary to protect the load from wind, rain, the sun or the like and a common method of doing this has been to strap large pieces of canvas, tarpaulins or similar covers over the load. This can require a lot of time and when such covers are not in use they are very susceptible to becoming torn and lost.

With this problem in mind it is the aim of my invention generally to provide a cover for an open top vehicle bed that can be mounted thereon and is collapsible to expose substantially the entire bed or any part thereof.

A further object of this invention is to provide a cover of the above class that can be securely fastened on all sides to adequately protect a load against the elements.

Still another object of this invention is to provide a cover having the characteristics set out above that can easily and quickly be completely removed from the vehicle bed without the use of any tools.

A still further object of my invention is to provide a vehicle bed cover as described that is simple in construction, economical to manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my cover mounted in extended position on a vehicle bed, with a portion of the cover cut away to more fully illustrate its construction, Fig. 2 is a cross-sectional view of this cover taken on the line 2—2 of Fig. 1, Fig. 3 is an enlarged elevational view of one corner of the frame of this device showing one

2 of the clamp means for securing it to the vehicle bed,

Fig. 4 is a cross-sectional view of this device taken on the line 4—4 of Fig. 1, and Fig. 5 is an elevational view of this device in retracted position with the cover portion cut away to more fully illustrate the cover supporting frame.

Referring to the drawings I have used the numeral 10 to designate generally an open top vehicle bed, wagon box or the like. It is for such a bed or box that my cover is more particularly designed. Two elongated rod frame members 11 are provided as frame guides for this cover and one is mounted longitudinally on each of the sides of the bed as I will later describe. Each end of each rod 11 is bent back upon itself as at 12 towards but not to its main portion and then bent downwardly at right angles to its main portion to form an S shape as illustrated. This bend at 12 serves as a stop means for bows as will become apparent from the description which follows: To the free end of such rod member 11 there is secured a downwardly extending inverted U-shaped clamp 13 which has a set screw 14 as shown in Fig. 3. Thus constructed, each rod member 11 can be mounted on one side of the box 10 by placing the clamps 13 as illustrated. The set screw 14 will secure the clamps in place but provides a means for quickly and easily removing them.

A plurality of bow members 15 are provided to support a cover 16 and I preferably use rod lengths bent as illustrated in Fig. 2 for this purpose. To each free end of each bow member 15 there is secured a collar 17 by means of which each bow member is slidably mounted on the respective frame guide rods 11. A flexible member 18 such as a cord, chain or like is provided for each side of this device and each respective chain extends between the two end bow members on one respective side and is secured to each bow member at equidistant points as shown in Fig. 4. Thus arranged, the bow members are transverse the longitudinal axis of the vehicle bed 10 and extendable or retractable along its longitudinal plane. The cover 16 which may be of canvas or any other serviceable material is mounted over the bow members in any suitable manner. To secure the cover along the sides and prevent it from flapping in the wind I provide a hook 19 on the outer side of each collar member 17. These hooks 19 are curved downwardly and a correspondingly positioned hole 20 along the side edges of the cover can be placed over each hook as shown in Fig. 1.

Each end of the cover 16 is turned back upon itself and stitched to provide a passageway to receive the rod member 21. This arrangement provides a means for securing the cover at its forwardly and rearwardly end which is accomplished by pulling the rod 21 over and under the curved portion 12 of the frame guide 11 so that it rests and is frictionally held in the S portion as illustrated in Fig. 4.

In operation, this device provides a secure cover that will protect a load from the elements and will not become ruffled or loose from the wind. It is simply mounted and can be retracted (Fig. 5) to expose substantially the entire vehicle for loading purposes. It is easily and quickly extended and can be secured on all four sides without the use of any tools. If desired, the entire cover and supporting frame can be quickly removed by loosening the set screws 14. It can be used on a variety of vehicle beds and no special construction or attachments are required for the bed on which it is used.

Some changes may be made in the construction and arrangement of my collapsible cover for a vehicle bed without departing from the real spirit and purpose of my invention, and it is my intention to cover by my claims, any modified forms of structure or use of mechanical equivalents which may be reasonably included within their scope.

I claim:

1. In combination, an open top vehicle bed, two elongated frame guide rods each having each end bent first under and back upon itself and then downwardly to form an S portion thereat and terminating in an inverted U-shaped clamp member adapted to be removably secured to each end portion respectively of each side of said vehicle bed, a plurality of bow members arranged transversely the longitudinal axis of said vehicle bed and slidably mounted on said frame guide rods, a flexible member on each side of said bow members extending between the end bow members on each side and secured to each bow on the respective sides, a flexible cover member secured over said bow members, means for securing said cover at its sides, a rod member arranged in each end of said cover member capable of being pulled over the first bend in said frame guide members and to be frictionally held in said S portion whereby the ends of said cover member are secured; said bow members retractable to expose said vehicle bed at times and extendable to enclose it at times.

2. In combination, an open top vehicle bed, two elongated frame guide rods each having each end bent first under and back upon itself and then downwardly to form an S portion thereat and terminating in an inverted U-shaped clamp member adapted to be removably secured to each end portion respectively of each side of said vehicle bed, a plurality of bow members arranged transversely the longitudinal axis of said vehicle bed and slidably mounted on said frame guide rods, a flexible member on each side of said bow members extending between the end bow members on each side and secured to each bow on the respective sides, a flexible cover member secured over said bow members; said cover member provided with a plurality of openings in spaced relationship along each side edge thereof, a hook member on each end of each bow member; the holes in said cover member capable of engaging a corresponding hook member to secure the sides of said cover member, a rod member arranged in each end of said cover member capable of being pulled over the first bend in said frame guide members and to be frictionally held in said S portion whereby the ends of said cover member are secured; said bow members retractable to expose said vehicle bed at times and extendable to enclose it at times.

3. In combination, an open top vehicle bed, two elongated frame guide rods each having each end bent first under and back upon itself and then downwardly to form an S portion thereat and terminating in an inverted U-shaped clamp member, said clamp member removably secured to each end portion respectively of each side of said vehicle bed, a plurality of bow members arranged transversely the longitudinal axis of said vehicle bed, a collar member on each end of each bow member, the collar members on each respective side slidably mounted on said frame guide rods, a flexible member on each side of said bow member extending between the end bow members on each side and secured to each bow on the respective sides, a flexible cover member secured over said bow members; said cover member provided with a plurality of openings in spaced relationship along each side edge thereof, a hook member on each collar; the holes in said cover member capable of engaging a corresponding hook member to secure the sides of said cover member, a rod member arranged in each end of said cover member capable of being pulled over the first bend in said frame guide members and to be frictionally held in said S portion whereby the ends of said cover member are secured; said bow members retractable to expose said vehicle bed at times and extendable to enclose it at times.

4. In a collapsible cover for a vehicle bed, a pair of elongated frame guide rods in parallel spaced relationship each having each end bent first under and back upon itself and then downwardly to form an S portion thereat and terminating in an inverted U-shaped clamp that is removably secured to each end portion respectively of each side of said vehicle bed, a plurality of bow members arranged transversely the longitudinal axis of said frame guide rod members and slidably mounted thereon; said bow members retractable at times and extendable at times along the longitudinal axis of said frame guide rod members, a flexible member on each side of said bow members extending between the end bows and secured to each bow on the respective sides, a flexible cover member secured over said bow members, means for securing said flexible cover at its sides, a rod member arranged in each end of said cover member capable of being pulled over the first bend in said frame guide rod members and to be frictionally held in said S portion whereby the ends of said flexible cover member are secured, said device as constructed designed to be detachably mounted on a vehicle bed.

5. In a collapsible cover for a vehicle bed, a pair of elongated frame guide rods in parallel spaced relationship each having each end bent first under and back upon itself and then downwardly to form an S portion thereat and terminating in a clamp means adapted to be removably secured to each end portion respectively of each side of a vehicle bed, a plurality of bow members arranged transversely the longitudinal axis of said frame guide rod members and slidably mounted thereon; said bow members retractable at times and extendable at times along the longitudinal axis of said frame guide rod members, a flexible member on each side of said bow members extending between the end bows and secured to each bow on the respective sides, a flexible cover member secured over said bow members; said cover member provided with a plurality of openings in spaced relationship along each side edge thereof, a hook member on each end of each bow member; the holes in said cover member capable of engaging a corresponding hook member to secure the sides of said cover member, a rod member arranged in each end of said cover member capable of being pulled over the first bend in said frame guide rod members and to be frictionally held in said S portion whereby the ends of said flexible cover member are secured, said device as constructed designed to be detachably mounted on a vehicle bed.

6. In a collapsible cover for a vehicle bed, a pair of elongated frame guide rods in parallel spaced relationship each having each end bent first under and back upon itself and then downwardly to form an S portion thereat and terminating in a clamp means adapted to be removably secured to each end portion respectively of each side of a vehicle bed, a plurality of bow members arranged transversely the longitudinal axis of said frame guide rod members, a collar member on each end of each bow member, the collar members on each respective side of said bow member slidably mounted on the corresponding frame guide rod members, a flexible member on each side of said box members extending between the end bows and secured to each bow on the respective sides, a flexible cover member secured over said bow members, said cover member provided with a plurality of openings in spaced relationship along each side edge thereof, a hook member on each collar member; the holes in said cover member capable of engaging a corresponding hook member to secure the sides of said cover member, a rod member arranged in each end of said cover member capable of being pulled over the first bend in said frame guide rod members and to be frictionally held in said S portion whereby the ends of said flexible cover member are secured, said device as constructed designed to be detachably mounted on a vehicle bed, said bow members retractable at times and extendable at times along the longitudinal axis of said frame guide rod members.

LAWRENCE SHIELD.

REFERENCES CITED

The following references are of record in the file of this patent:

UNITED STATES PATENTS

| Number | Name | Date |
|---|---|---|
| 1,263,759 | Hanaway | Apr. 23, 1918 |
| 1,713,923 | Schlicher | May 21, 1929 |
| 2,510,307 | Daniels | June 6, 1950 |
| 2,559,310 | McNavage | July 3, 1951 |